United States Patent Office 3,402,179
Patented Sept. 17, 1968

3,402,179
PHTHALIMIDOMETHYL ALKYNYL ETHERS
Keimei Fujimoto, Minoo-shi, Yositosi Okuno, Nishi-nomiya-shi, Kenzo Ueda, Toyanaka-shi, Sadao Horie, Suita-shi, Toshio Mizutani, Ikeda-shi, and Katsuji Nodera, Minoo-shi, Japan, assignors to Sumitomo Chemical Company, Ltd., Osaka, Japan, a corporation of Japan
No Drawing. Filed Jan. 21, 1966, Ser. No. 522,049
Claims priority, application Japan, Jan. 25, 1965, 40/3,958; Apr. 30, 1965, 40/25,736; June 8, 1965, 40/34,287; Sept. 1, 1965, 40/53,742
6 Claims. (Cl. 260—326)

ABSTRACT OF THE DISCLOSURE

A phthalimide compound having the formula,

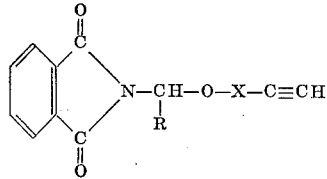

wherein X is $-CH_2-$, $-CH_2CH_2-$ or

and R is a hydrogen or methyl group. These compounds are useful as synergists for pyrethrin, allethrin, various chrysanthemumic acid ester-type insecticides and carbamate-type insecticides.

---

This invention relates to novel synergists consisting of phthalimide derivatives and to a method for producing the same. More specifically, this invention relates to novel synergists consisting of phthalimide derivatives represented by the general formula:

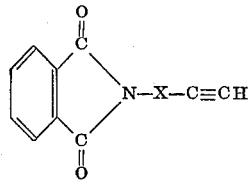

wherein X is a radical of $-CH_2-CH_2-$,

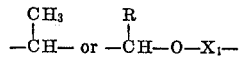

in which $X_1$ is a radical of $-CH_2-$, $-CH_2-CH_2-$ or

and R is a hydrogen atom or methyl radical, and to a method for producing phthalimide derivatives represented by the general Formula I.

It has been known that sesamin included in sesame oil and the like have function for increasing the insecticidal power of chrysanthemumic acid ester-type insecticides. In other words, such materials have no insecticidal power by themselves but when they are added to a chrysanthemumic acid ester-type insecticide in a suitable amount, a notable increase of insecticidal power is observed as compared with the case where the insecticide alone is used. In general, such function is called synergism and the agent possessing such function is called a synergist.

Since sesamin and the like included in sesame oil possess a methylenedioxyphenyl radical in their molecule, various kinds of compounds possessing such a radical are synthesized. As synergists for pyrethrin, alpha-[2-(2-butoxyethoxy)ethoxy] - 4,5-methylenedioxy-2-propyltoluene (common name: piperonyl butoxide), 1,2-methylenedioxy - 4 - [2 - (octylsulfonyl)propyl]-benzene (common name: sulfoxide) and the like are being used widely now. In addition, N - (2 - ethylhexyl)-bicyclo[2,2,1]hept-5-en-2,3-dicarboximide (MGK–264, a trade name of Melaughlin Gormley King Co.) and many other synergists have been available from the market. However, the piperonyl butoxide which is now most commonly used, possesses somewhat inferior synergism to allethrin, though it has superior synergism to natural pyrethrin and carbamate-type insecticides such as 1-naphthyl N-methylcarbamate (common name: carbaryl) and the like, as well as various other chrysanthemumic acid ester-type insecticides which have been invented by the present inventors. While, MGK–264 possesses inferior synergism to natural pyrethrin, though it has superior synergism to allethrin and other insecticides. Furthermore, the conventional synergists as mentioned above are produced with much high cost. Thus, there has never been found synergist which indicates a notable effectiveness to all kinds of such insecticides.

Accordingly, an object of the present invention is to provide a synergist possessing remarkable synergism not only to natural pyrethrin and allethrin but also to various kinds of chrysanthemumic acid ester-type insecticides which have been invented by the present inventors, as well as carbamate-type insecticides such as 1-naphthyl-N-methylcarbamate (common name: carbaryl) and the like.

Another object of the present invention is to provide a synergist which can be produced at a less expense and which has lower order of toxicity to mammals, compared with that of the conventional synergist.

The present inventors have now found that these and other objects may be accomplished by the provision of a phthalimide derivative represented by the general formula:

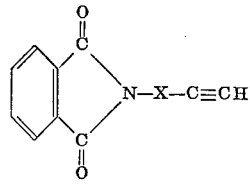

wherein X is a radical of $-CH_2-CH_2-$,

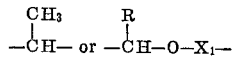

in which $X_1$ is a radical of $-CH_2-$, $CH_2-CH_2-$ or

and R is a hydrogen atom or methyl radical.

Namely, the insecticidal power is notably increased when such phthalimide derivatives are added to chrysanthemumic acid ester-type or carbamate-type insecticides or the mixture thereof in an amount of from 0.5 to 20 times amount of insecticides.

A further object of the present invention is to provide methods for producing phthalimide derivatives represented by the general Formula I.

In accordance with the present invention, the novel phthalimide derivative represented by the general Formula I is produced simply and efficiently by contacting an alkali metal salt of phthalimide represented by the general formula:

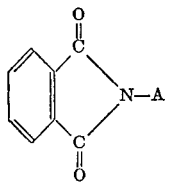

(II)

wherein A is sodium or potassium atom, and a chlorobutyne represented by the general formula:

$$CH \equiv C - X_2 - Cl \quad \quad (III)$$

wherein $X_2$ is a radical of $-CH_2-CH_2-$ or $$\begin{array}{c} -CH- \\ | \\ CH_3 \end{array}$$

or a chloroalkyl alkynyl ether represented by the general formula:

(IV)

wherein $X_1$ and R have the same meanings as identified above, preferably in the presence of an inert solvent having a large polarity such as dimethylformamide or the like.

Chloroalkyl alkynyl ethers (IV) employed in the production of the present compounds can be produced readily with excellent yield passing dry hydrogen chloride through a mixture of a corresponding acetylenic alcohol and paraformaldehyde or paraaldehyde.

Following examples are given to illustrate the method for producing the phthalimide derivative in accordance with the present invention without limiting its scope.

Example 1

A mixture of 5.8 g. of 3-chloro-1-butyne, 12.4 g. of potassium phthalimide and 25 ml. of dimethylformamide was heated at a temperature of 120° C. for 30 minutes, and further at a temperature of 150° to 160° C. for 30 minutes. The hot reaction mixture was poured onto ice and subjected to extraction three times with each 15 ml. of chloroform. The combined chloroform layer was washed 1 N aqueous solution of potassium hydroxide, water and 0.5 N-hydrochloric acid in this order. Drying over anhydrous magnesium sulfate and removal of chloroform by distillation left N-(1-methyl-2-propynl)phthalimide having the following formula and M.P. 110° C.–112° C., in yield of 11.3 g. (87 percent):

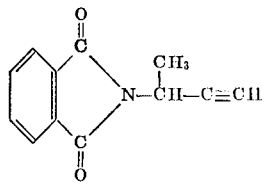

(1)

Recrystallization from ethanol yielded the pure product having M.P. 111.5° C.–112.5° C.

*Elementary analysis, percent.* — Calculated for $C_{12}H_9NO_2$: C, 72.36; H, 4.52; N, 7.04. Found: C, 72.49; H, 4.50; N, 7.05.

Example 2

A mixture of 5.8 g. of 4-chloro-1-butyne, 11.3 g. of sodium phthalimide and 25 ml. of dimethylformamide was heated as in Example 1. Hot reaction mixture was poured onto ice. The precipitated crystals were filtered, washed with cold water and dried, thereby to obtain 10.9 g. (yield of 85%) of N-(3-butynyl)phthalimide having the following formula and M.P. of 136°–139° C. Recrystallization from ethanol gave pure product having M.P. of 140°–141° C.

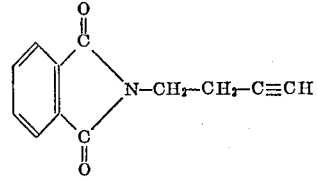

(2)

*Elementary analysis, percent.* — Calculated for $C_{12}H_9NO_2$: C, 72.36; H, 4.52; N, 7.04. Found: C, 72.21; H, 4.56; N, 7.13.

Example 3

Five point three grams portion of 1-chloromethoxy-2-propyne was dropped into a mixture of 9.5 g. of potassium phthalimide and 30 ml. of dimethylformamide. The mixture was gradually heated up to a temperature of 150° C. and maintained at this temperature for 15 minutes. The hot reaction mass was poured onto ice and subjected to extraction three times respectively with 15 ml. of chloroform. The combined chloroform layer was washed with aqueous solution of 1 N-potassium hydroxide, water, 0.5 N-hydrochloric acid and then water in this order and dried over anhydrous magnesium sulfate. Removal of chloroform by distillation left 7.1 g. (a yield of 66%) of phthalimidomethyl 2-propynyl ether having the following formula:

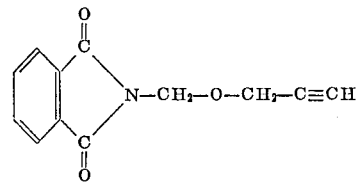

(3)

Recrystallization from ethanol gave the pure product having M.P. of 97° C.–98.5° C.

*Elementary analysis, percent.* — Calculated for $C_{12}H_9NO_3$: C, 66.98; H, 4.19; N, 6.51. Found: C, 66.92; H, 4.35; N, 6.44.

Example 4

Five point nine grams portion of 1-chloromethoxy-3-butyne was dropped into a mixture of 8.6 g. of sodium phthalimide and 30 ml. of dimethylformamide. The mixture was gradually heated up to a temperature of 120° C. and maintained at this temperature for 30 minutes and further heated and stirred at a temperature of 145°–150° C. for 20 minutes. The crystals precipitated by pouring the hot reaction liquid onto ice were filtered, washed with cold water and dried, thereby to obtain 9.2 g. (80% yield) of phthalimidomethyl 3-butynyl ether having the following formula.

Recrystallization from a mixture of ethyl acetate and n-hexane gave the pure product having M.P. of 82° C.–83.5° C.

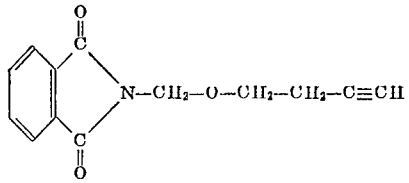

(4)

*Elementary analysis, percent.* — Calculated for $C_{13}H_{11}NO_3$: C, 68.12; H, 4.80; N, 6.11. Found: C, 67.88; H, 4.75; N, 6.09.

Example 5

According to the procedure similar to that of Example 4, 5.9 g. of 1-(1-chloroethoxy)-2-propyne, 9.5 g. of potassium phthalimide and 30 ml. of dimethylformamide were treated to obtain 9.9 g. of 1-phthalimidoethyl 2-propynyl ether having the following formula. Recrystallization from a mixture of ethyl acetate and n-hexane gave the pure product having M.P. of 81° C.–82° C.

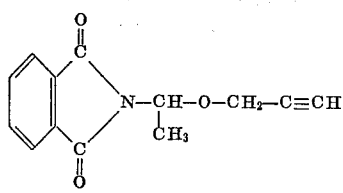

(5)

*Elementary analysis, percent.* — Calculated for $C_{13}H_{11}NO_3$: C, 68.12; H, 4.80; N, 6.11. Found: C, 67.76; H, 4.88; N, 6.15.

It is obvious from the following two series of experiments that the present compounds as mentioned above are effective as a synergist to the chrysanthemumic acid ester-type and carbamate-type insecticides.

In one series, on the one hand, N-(1-methyl-2-propynyl) phthalimide obtained in Example 1 and piperonyl butoxide were respectively added to natural pyrethrin, allethrin and carbaryl in an amount of 5 times the weight of each above-mentioned insecticides and each of the mixtures was diluted to various desired test concentrations with acetone. On the other hand, insecticidal solutions containing no synergist were also prepared with acetone. Insecticidal powers were tested by topical application method on the Pronotum of houseflies (adult) with the prepared each acetone solutions. Fifty percent lethal doses ($LD_{50}$) after 24 hours were shown in the following Table 1.

TABLE 1

| Name of insecticides | Name of synergists | $LD_{50}$ ($\gamma$/Fly) | Degree of synergism |
|---|---|---|---|
| Natural pyrethrin | ------ | 0.21 | 1.0 |
|  | Piperonyl butoxide | 0.045 | 4.7 |
|  | The present compound (1) | 0.050 | 4.2 |
| Allethrin | ------ | 0.52 | 1.0 |
|  | Piperonyl butoxide | 0.155 | 3.4 |
|  | The present compound (1) | 0.128 | 4.1 |
| Carbaryl | ------ | >5 | 1.0 |
|  | Piperonyl butoxide | 0.18 | >27.7 |
|  | The present compound (1) | 0.14 | >35.7 |
|  | Piperonyl butoxide | >5 |  |
|  | The present compound (1) | >5 |  |

$C_{13}H_{11}NO_3$: C, 68.12; H, 4.80; N, 6.11. Found: C, 68.01; H, 4.72; N, 6.06.

Example 6

According to the same procedure as in Example 4, 6.6 g. of 2-(1-chloroethoxy)-3-butyne, 9.5 g. of potassium phthalimide and 30 ml. of dimethylformamide were treated to obtain 10.7 g. of 1-phthalimidoethyl 1-methyl-2-propynyl ether having the following formula:

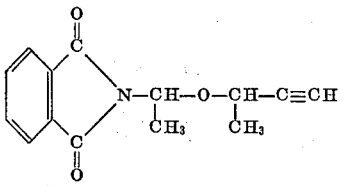

(6)

Recrystallization from a mixture of ethyl acetate and n-hexane gave the pure product having M.P. of 88° C.–91° C.

*Elementary analysis, percent.* — Calculated for $C_{14}H_{13}NO_3$: C, 69.14; H, 5.35; N, 5.76. Found: C, 69.07; H, 5.38; N, 5.66.

Example 7

According to the same procedure as in Example 4, 5.9 g. of 2-chloromethoxy-3-butyne, 9.5 g. of potassium phthalimide and 30 ml. of dimethylformamide were treated to obtain 9.4 g. of phthalimidomethyl 1-methyl-2-propynyl ether having the following formula:

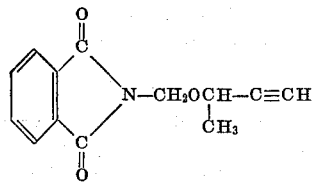

(7)

Recrystallization from a mixture of ethyl acetate and n-hexane gave the pure product having M.P. of 86° C.–88° C.

In another series, on the one hand the present compounds obtained in Examples 3 to 7 shown in the following were each added to natural pyrethrin, allethrin, N-(chrysanthemoxymethyl) - 3,4,5,6-tetrahydrophthalimide or carbaryl in an amount of 5 times the weight of each above-mentioned insecticide and each of the mixtures was diluted to various desired test concentrations with acetone. On the other hand, insecticidal solutions containing no synergists were also prepared with acetone.

The present compounds employed in this experiment were as follows:

(3)

[structure] N—CH$_2$—O—CH$_2$—C≡CH

Phthalimidomethyl 2-propynyl ether (4)

[structure] N—CH$_2$—O—CH$_2$—CH$_2$—C≡CH

Phthalimidomethyl 3-butynyl ether (5)

[structure] N—CH—O—CH$_2$—C≡CH
                 |
                 CH$_3$ 1-phthalimidoethyl 2-propynyl ether (6)

[structure] N—CH—O—CH—C≡CH
                 |         |
                 CH$_3$    CH$_3$ 1-phthalimidoethyl 1-methyl-2-propynyl ether (7)
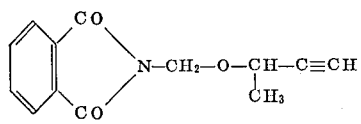

Phthalimidomethyl 1-methyl-2-propynyl ether

Insecticidal powers were also tested as in the foregoing series and 50% lethal doses ($LD_{50}$) after 24 hours are shown in the following Table 2:

like, it may be conveniently formulated using a preliminarily prepared solution containing, as the insecticidal ingredient, chrysanthemumic acid ester-type or carbamate-type insecticide and a suitable amount of the synergist of the novel phthalimide compound in an organic solvent such as xylene, methylnaphthalene, acetone, trichloroethane or the like, according to the method known to those skilled in the art.

Depending upon the purposes, the insecticidal effectiveness of insecticides may be increased by combination of the present compounds with other insecticidal pyrethroid synergists such as piperonyl butoxide, sulfoxide or MGK–

TABLE 2

| Name of insecticides | Name of synergists | $LD_{50}$ ($\gamma$/Fly) | Degree of synergism |
| --- | --- | --- | --- |
| Natural pyrethrin | | 0.240 | 1.0 |
| | The present compound (4) | 0.075 | 3.2 |
| | The present compound (7) | 0.090 | 2.7 |
| Allethrin | | 0.55 | 1.0 |
| | The present compound (4) | 0.14 | 3.9 |
| | The present compound (7) | 0.17 | 3.2 |
| N-(chrysanthemoxy-methyl)-3,4,5,6,-tetrahydrophthalimide. | | 0.46 | 1.0 |
| | The present compound (3) | 0.095 | 4.8 |
| | The present compound (4) | 0.085 | 5.4 |
| | The present compound (5) | 0.11 | 4.2 |
| | The present compound (6) | 0.15 | 3.1 |
| | The present compound (7) | 0.10 | 4.6 |
| Carbaryl | | >5 | 1.0 |
| | The present compound (3) | 0.2 | >25 |
| | The present compound (4) | 0.15 | >33.3 |
| | The present compound (5) | 0.7 | >7.1 |
| | The present compound (7) | 0.25 | >20 |
| | The present compound (3) | >5 | |
| | The present compound (4) | >5 | |
| | The present compound (5) | >5 | |
| | The present compound (6) | >5 | |
| | The present compound (7) | >5 | |

Insecticides of chrysanthemumic acid ester-type and carbamate-type which can be activated by the phthalimide compounds of the present invention are illustrated as follows without limiting its scope. They are natural pyrethrin, allethrine, dimethrin (2,4-dimethylbenzyl chrysanthemate), barthrin (2-chloro - 4,5 - methylenedioxybenzyl chrysanthemate), N - (chrysanthemoxymethyl) phthalimide, N - (chrysanthemoxymethyl) - monothiophthalimide, N-(chrysanthemoxymethyl)-3,4,5,6-tetrahydrophthalimide, N - (chrysanthemoxymethyl)dimethylmaleimide, N - (chrysanthemoxymethyl)-1,4-cyclohexadiene-1,2-dicarboxyimide, 3,5-dimethyl-4-dimethylaminophenyl N-methylcarbamate, 2 - chlorophenyl N-methylcarbamate, Cevin (1-naphthyl-N-methylcarbamate), 3,4-dimethyl - 6 - chlorophenyl N - methylcarbamate and 6-chrysanthemoxymethyltetralin.

Compositions prepared by adding the phthalimide compound of the present invention to the above-mentioned conventional insecticides of chrysanthemumic acid ester-type or carbamate - type or a mixture thereof in an amount of from 0.5 to 20 times amount of the conventional insecticides, are not only effective to sanitary insects such as houseflies, mosquitoes, cockroaches and the like, insects injurious to rice planting, such as *Chilo suppressalis* Walker, *Sogata furcifera* Horvath, *Nilaparvata lugens* Stal, *Delphacodes striatella* Fallen, *Nephotettix bipunctatus* Uhler, and other rice insects, larvae of Lepidoptera injurious to fruit trees, and green vegetables, such as *Pieris rapae crucivora* Boisduval, parasitic mites to plants, insects injurious to storage, such as *Calandra oryzae* Linne, *Ephestia cautella* Walker and the like, but also effective to the control of other insects injurious to agriculture, sanitation, forest and horticulture.

For the formulation of the insecticidal composition in the present invention, it may be formulated into oil preparations, emulsifiable concentrates, wettable powders, dusts, baits, spray, mosquito coils, fumigants or the like by using one or more synergists of the present invention as it is, one or more insecticides and common auxiliary agents for the insecticide.

Moreover, depending upon the type of formulation, i.e. in case of dust preparations, baits, mosquito coils or the 264. Further it is also possible to prepare a multipurpose composition by incorporating therein other active ingredients such as insecticides of organic chloro-compounds, organic phosphorus compounds, fungicides, acaricides, fertilizers, and other agricultural chemicals.

Following examples are given to illustrate the method for the preparation of the compositions of the present invention and their effectiveness but should be understood that it is by no means intended to limit the scope of the present invention.

Parts by weight are used throughout.

Example 8

To 0.1 part of N-(chrysanthemoxymethyl)-3,4,5,6-tetrahydrophthalimide, 0.5 part of N-(1-methyl-2-propynyl) phthalimide (Example 1) was added. The mixture was dissolved in 15 parts of trichloroethane and diluted to 100 parts in total with refined kerosene, thereby to obtain an oil solution.

Example 9

To 0.1 part of N-(chrysanthemoxymethyl)-dimethylmaleimide, 0.5 part of N-(3-butynyl)phthalimide (Example 2) was added. The mixture was dissolved in 10 parts of xylene and diluted to 100 parts in total with refined kerosene, thereby to obtain an oil solution.

Example 10

To 0.1 part of allethrin, 0.5 part of the present compound (Example 2) was added. The mixture was dissolved in 10 parts of xylene and diluted to 100 parts in total with refined kerosene, thereby to obtain an oil solution.

Example 11

To 0.3 part of N-(chrysanthemoxymethyl)-3,4,5,6-tetrahydrophthalimide, 1.5 parts of the present compound (Example 1) was added, and the mixture was dissolved in 20 parts of acetone. Ninety-eight point two parts portion of 200 mesh talc was added thereto and thoroughly stirred and mixed in an attrition mill. Removal of acetone by evaporation gave the dust preparation.

Example 12

Zero point two part of N-(chrysanthemoxymethyl)-3,4,5,6 - tetrahydrophthalimide, 0.8 part of the present compound (Example 2), 6.5 parts of xylene and 7.5 parts of refined kerosene were mixed together and the mixture was charged in an aerosol vessel. After fitting up the valve part, 85 parts of a spraying agent (e.g. Fleon; tradename of E. I. du Pont de Nemours & Co., Inc.; hydrocarbon fluoride, monomeric vinyl chloride, liquefied petroleum gas or the like) was charged therein under pressure through said valve part, thereby to obtain an aerosol.

Example 13

One part of pyrethrum extract (containing 20 percent of pyrethrin), 0.8 part of the present compound (Example 1), 6.5 parts of xylene, and 6.7 parts of refined kerosene were mixed together and the mixture was charged in an aerosol vessel. After fitting up the valve part, 85 parts of a spraying agent (e.g. Fleon, monomeric vinyl chloride, refined kerosene or the like) was charged therein under pressure, thereby to obtain an aerosol.

Example 14

A mixture of 1.5 parts of 3,4-dimethyl-6-chlorophenyl N-methyl carbamate and 3 parts of the present compound (Example 1) was dissolved in 20 parts of acetone. After adding 95.5 parts of 200 mesh talc thereto, the mixture was stirred and mixed thoroughly in an attrition mill. Evaporation of acetone gave the dust preparation.

Example 15

A mixture of 1.5 parts of carbaryl and 3 parts of the present compound (Example 2) was dissolved in 20 parts of acetone. After 95.5 parts of 200 mesh talc was added thereto, the mixture was stirred and mixed thoroughly in an attrition mill. Evaporation of acetone gave the dust preparation.

Example 16

A mixture of 0.5 part of 3,4-dimethyl-6-chlorophenyl N-methyl carbamate and 1 part of the present compound (Example 1) was dissolved in 20 parts of acetone. After adding 98.5 parts of 200 mesh talc thereto, the mixture was thoroughly stirred in an attrition mill. Evaporation of acetone gave the dust preparation.

Example 17

A mixture of 0.5 part of carbaryl and 1 part of the present compound (Example 1) was dissolved in 20 parts of acetone. After 98.5 parts of 200 mesh talc was added, the mixture was thoroughly stirred in an attrition mill. Evaporation of acetone gave the dust preparation.

Example 18

To 0.1 part of N-(chrysanthemoxymethyl)-dimethylmaleimide, 0.5 part of the present compound (Example 3), phthalimidomethyl 2-propynyl ether, was added, the mixture was dissolved in 10 parts of xylene and made into 100 parts in total by adding refined kerosene, thereby to obtain an oil solution.

Example 19

A mixture of 0.2 part of 6-chrysanthemoxymethyltetralin and 0.8 part of the present compound (Example 4), phthalimidomethyl 3-butynyl ether, was dissolved in 10 parts of xylene and made into 100 parts in total by adding refined kerosene, thereby to obtain an oil solution.

Example 20

A mixture of 0.1 part of N-(chrysanthemoxymethyl) monothiophthalimide and 0.5 part of the present compound (Example 5), 1-phthalimidoethyl 2-propynyl ether, was dissolved in 10 parts of xylene and made into 100 parts by adding refined kerosene, thereby to obtain an oil solution.

Example 21

A mixture of 0.2 part of dimethrin and 0.8 part of the present compound (Example 6), 1-phthalimidoethyl 1-methyl-2-propynyl ether, was dissolved in 10 parts of xylene and diluted to 100 parts with refined kerosene to obtain an oil solution.

Example 22

A mixture of 2 parts of pyrethrum extract (containing 20 percent pyrethrin), 1.6 parts of phthalimidomethyl 1-methyl-2-propynyl ether (Example 7), 2 parts of DDT, 5 parts of xylene and 4.4 parts of refined kerosene were charged in an aerosol vessel. After the valve part was fitted up, 85 parts of a spraying agent (e.g. Fleon, monomeric vinyl chloride, liquefied petroleum gas or the like) was charged into the vessel under pressure through the valve, thereby to obtain an aerosol.

Example 23

A mixture of 0.4 part of allethrin, 1.6 parts of phthalimidoethyl 1-methyl-2-propynyl ether (Example 7), 0.5 part of O,O - dimethyl-O-(3-methyl-4-nitrophenyl)thiophosphate, 6.5 parts of xylene and 6 parts of refined kerosene were charged in an aerosol vessel. Through the valve part, 85 parts of a spraying agent (e.g. Fleon, monomeric vinyl chloride, liquefied petroleum gas or the like) was charged into the vessel under pressure, thereby to obtain an aerosol.

Example 24

A mixture of 0.4 part of N-(chrysanthemoxymethyl)-3,4,5,6-tetrahydrophthalimide, 1.6 parts of the present compound (Example 3), 2 parts of 2,2-bis(p-methoxyphenyl)-1,1,1-trichloroethane, 6 parts of xylene, and 5 parts of refined kerosene were charged in an aerosol vessel. After the valve part was fitted up, 85 parts of a spraying agent (e.g. Fleon, monomeric vinyl chloride, liquefied petroleum gas or the like) were charged into the vessel through the valve under pressure, thereby to obtain an aerosol.

Example 25

A mixture of 0.3 part of N-(chrysanthemoxymethyl)-3,4,5,6-tetrahydrophthalimide and, 1.5 parts of the present compound (Example 3) were dissolved in 20 parts of acetone. After 98.2 parts of 300 mesh kieselguhr were added thereto, the mixture was thoroughly stirred in an attrition mill. Evaporation of acetone gave the dust preparation.

Example 26

A mixture of 0.5 part of carbaryl and 1 part of the present compound (Example 4) were dissolved in 20 parts of acetone. After 98.5 parts of 200 mesh talc was added thereto, the mixture was thoroughly stirred in an attrition mill. Evaporation of acetone gave the dust preparation.

Example 27

An emulsifiable concentrate was obtained by mixing and dissolving with stirring, 10 parts of N-(chrysanthemoxymethyl)-3,4,5,6-tetrahydrophthalimide, 20 parts of the present compound (Example 3), 15 parts of Sorpole SM–200 (a registered trade name of Toho Chemical Co.: a mixture of calcium alkylarylsulfonate and polyoxyethylene sorbitan alkylate) and 55 parts of xylene.

Example 28

A wettable powder was obtained by thoroughly mixing 20 parts of 3,4-dimethyl-6-chlorophenyl N-methylcarbamate, 40 parts of the present compound (Example 6), 5 parts of Sorpole SM–200, adding 35 parts of 300 mesh talc and further mixing well in an attrition mill.

Example 29

A wettable powder was obtained by well mixing 20 parts of N-(chrysanthemoxymethyl)-3,4,5,6-tetrahydrophthalimide, 20 parts of the present compound (Example 4), 20 parts of piperonyl butoxide, 1.5 parts of Sorpole 5029–0 (a registered trade name of Toho Chemical Co.; alkylsulfate) and 3.5 parts of lignin, adding 35 parts of 300 mesh kieselguhr and further mixing well in an attrition mill.

Example 30

To a mixture of 5 parts of N-(chrysanthemoxymethyl)-monothiophthalimide and 20 parts of the present compound (Example 5), 5 parts of Toyolignin CT (a registered trade name of Toyo Spinning Co.; lignin sulfonate) and 70 parts of GSM clay (a registered trade name of Zieglight Kogyo Co.; siliceous clay) were added and the mixture was thoroughly stirred in an attrition mill. Water was added thereto in an amount of 10 percent of the mixture.

The resulting mixture was further stirred and charged into a granulator to make into granules, which are dried in the air. Thus a granule was obtained.

Example 31

Together with the preparations of oil solutions of Examples 8 to 10, oil solutions containing the corresponding insecticide alone were prepared similarly as in Examples 8 to 10. By the Campbell's turn table method (Soap and Sanit. Chemicals, Vol. 14, No. 6, p. 119 (1938)) and using a group of about 100 houseflies (adult), 5 ml. of each oil solution was atomized with a spray gun under a pressure of 10 lb./sq. in., houseflies were exposed to settling mist for 10 minutes, taken out, given feed and left in a thermostat at a temperature of 27° C. Mortality was calculated by observing killed numbers after 24 hours. The result is shown in Table 3.

TABLE 3

| Insecticidal composition | Mortality, percent |
| --- | --- |
| The composition of Example 8 | 100 |
| An oil solution of 0.1 percent N-(chrysanthemoxymethyl)-3,4,5,6-tetrahydrophthalimide | 54.5 |
| The composition of Example 9 | 100 |
| An oil solution of 0.1 percent N-(chrysanthemoxymethyl)-dimethyl maleimide | 48.5 |
| The composition of Example 10 | 100 |
| An oil solution of 0.1 percent allethrin | 40.0 |

Example 32

As the control, a dust containing 0.5 percent N-(chrysanthemoxymethyl) - 3,4,5,6-tetrahydrophthalimide alone was prepared similarly as in Example 11. Butter was smeared on the side wall of a high Petri dish having an inside diameter of 14 cm. and a height of 7 cm., leaving non-smeared part of about 1 cm. from the bottom and each dust was evenly scattered on the bottom of the dish at a rate of 2 g./m.² A group of 10 German cockroaches (adult) was liberated there, exposed for 10 minutes and number of knocked down insects was observed. After taken out of the dish, the insects were fed. Number of killed insects was observed after 3 days. The result of the case of the composition of Example 11 and the control is indicated in Table 4.

TABLE 4

| Insecticidal composition | Knockdown, percent after 10 minutes | Mortality, percent after 3 days |
| --- | --- | --- |
| The composition of Example 11 | 100 | 100 |
| A dust of 0.5 percent N-(chrysanthemoxymethyl)-3,4,5,6-tetrahydrophthalimide | 100 | 60 |

Example 33

Similarly as in Examples 12 and 13, control aerosols containing 0.4 percent of the corresponding insecticide alone were prepared. By use of Nagasawa's mist settling apparatus (Bochu Kagaku 18 (4), 183–192) each aerosol was atomized for 1 second. A shutter was opened after 30 seconds, a group of 20 houseflies (adult) was exposed to settling mist and number of knocked down houseflies was observed relative to the lapse of time. After lapse of 10 minutes, houseflies were taken out, transferred to an observation cage, kept in a thermostat at a temperature of 27° C. for 24 hours and number of killed was observed. The result observed in cases of the compositions of Examples 12 and 13 and the controls is shown in Table 5.

TABLE 5

| Insecticidal composition | Knockdown ratio relative to the lapse of time, percent | | | | | Mortality ratio, percent |
| --- | --- | --- | --- | --- | --- | --- |
| | 1 minute | 2 minutes | 4 minutes | 6 minutes | 10 minutes | |
| The composition of Example 12 | 2.1 | 5.2 | 26.0 | 64.2 | 87.6 | 75.6 |
| Aerosol of 0.4 percent N-(chrysanthemoxymethyl)-3,4,5,6-tetrahydrophthalimide | | 24.2 | 56.9 | 78.8 | 87.8 | 50.4 |
| The composition of Example 13 | 1.0 | 12.8 | 50.6 | 77.3 | 92.1 | 80.4 |
| Aerosol of 0.4% pyrethrins | | 26.4 | 76.7 | 79.7 | 80.6 | 60.9 |

Example 34

Similarly as in Example 14, as the control, a dust containing 1.5 percent of 3,4-dimethyl-6-chlorophenyl N-methylcarbamate alone was prepared. About 20 growing rice seedlings having passed 20 days after seed-sowing in 3 inch flower pots were exposed to each dust by use of bell jar duster (J. Econ. Entomol. 41: 647–648 (1948)) under 20 lb./in.² pressure for 4 minutes. The whole set was covered with a metal screen and about 20 adults of brown planthopper were liberated therein, kept in a thermostat at a temperature of 25° C. for 24 hours and number of killed was observed. The result of observed motality in cases of the composition of Example 14 and the control is shown in Table 6.

TABLE 6

| Insecticidal Composition | The amount applied, mg. | Mortality, percent |
| --- | --- | --- |
| The composition of Example 14 | 40 | 100 |
| A dust containing 1.5 percent of 3,4-dimethyl-6-chlorophenyl N-methylcarbamate | 40 | 40.3 |

Example 35

Similarly as in Example 15, as the control, a dust containing 1.5 percent of carbaryl alone was prepared, and by use of a bell jar duster as in Example 34, the effectiveness of the insecticidal composition of Example 15 and of the control was examined by liberating small brown planthopper, the result of which is shown in Table 7.

TABLE 7

| Insecticidal Composition | The amount applied, mg. | Mortality, percent |
| --- | --- | --- |
| The composition of Example 15 | 40 | 100 |
| A dust containing 1.5 percent of carbaryl | 40 | 55 |

Example 36

Similarly as in Examples 16 and 17, as the controls, dusts containing each 1.5 percent of the corresponding insecticide alone were prepared and by the same procedure as in Example 32, adults of German cockroach were exposed to the dusts of Examples 16 and 17 and controls. The result is shown in Table 8.

TABLE 8

| Insecticidal Composition | Knockdown ratio after 10 minutes, percent | Mortality after 3 days, percent |
|---|---|---|
| The composition of Example 16 | 50 | 100 |
| A dust containing 0.5 percent of 3,4-dimethyl-6-chlorophenyl N-methylcarbamate | 10 | 50 |
| The composition of Example 17 | 20 | 100 |
| A dust containing 0.5 percent of carbaryl | 0 | 30 |

Example 37

Together with the preparation of oil solutions of Examples 18, 19, 20 and 21, oil solutions containing the corresponding insecticide alone were prepared similarly. By the Campbell's turn table method (Soap and Sanit. Chemicals, vol. 14, No. 6, p. 119 (1938)) and by use of a group of about 100 houseflies (adult), 5 ml. of each oil solution was atomized, houseflies were exposed to settling mist for 10 minutes and numbers of knocked down flies were observed. Thereafter flies were taken out, given feed and kept in a thermostat at a temperature of 27° C. Mortality was calculated by observing killed numbers after 24 hours. Result of the case of the compositions of Examples 18 to 21 and the controls is shown in Table 9.

TABLE 9

| Insecticidal Composition | Knockdown ratio after 10 minutes, percent | Mortality after 3 days, percent |
|---|---|---|
| The oil solution of Example 18 | 100 | 97 |
| An oil solution containing 0.1% of the insecticide of Example 18 alone | 100 | 53 |
| The oil solution of Example 19 | 0 | 98 |
| An oil solution containing 0.1% of the insecticide of Example 19 alone | 0 | 68 |
| The oil solution of Example 20 | 100 | 97 |
| An oil solution containing 0.1% of the insecticide of Example 20 alone | 100 | 64 |
| The oil solution of Example 21 | 0 | 93 |
| An oil solution containing 0.1% of the insecticide of Example 1 alone | 0 | 44 |

Example 38

Aerosols obtained in Examples 22, 23 and 24 were atomized for 1 second in each 70 cm.$^3$ glass chamber where about 20 houseflies (adult) had been liberated. For 8 minutes, number of knocked down insects was observed relative to the lapse of time. After the lapse of 8 minutes, only knocked down insects were gathered, transferred to an observation cage, and given feed. Mortality was calculated by observing killed insects after 24 hours.

TABLE 10

| Insecticidal composition | Average atomized amount, mg. | Knockdown ratio relative to the lapse of time, percent | | | | | Mortality, percent |
|---|---|---|---|---|---|---|---|
| | | 30″ | 1′ | 2′ | 4′ | 8′ | |
| The composition of Example 22 | 740 | 4 | 27 | 50 | 66 | 83 | 72 |
| The composition of Example 23 | 690 | 2 | 13 | 29 | 64 | 81 | 75 |
| The composition of Example 24 | 700 | 4 | 20 | 44 | 73 | 88 | 80 |

Example 39

The dusts obtained in Examples 25 and 26 were uniformly scattered on the bottom of a high glass Petri dish having a 14 cm. diameter at a rate of 2 g./m.$^2$. Butter was smeared on the side wall leaving about 1 cm. from the bottom non-smeared. In this dish, a group of 10 German cockroaches were liberated therein, exposed to the dust for 10 minutes and numbers of knocked down insects were observed. Then the knocked down insects were taken out, transferred to a new vessel, given feed and after 3 days killed numbers were observed. The result is shown in Table 11.

TABLE 11

| Insecticidal Composition | Knockdown ratio after 10 minutes, percent | Mortality after 3 days, percent |
|---|---|---|
| The composition of Example 25 | 100 | 100 |
| The composition of Example 26 | 40 | 100 |

Example 40

The emulsifiable concentrate obtained in Example 27 was diluted to 40 times volume with water and with use of an atomizer, 0.7 ml. of diluted emulsion was sprayed in a 70 cm.$^3$ glass chamber where about 20 houseflies (adult) had been liberated. Numbers of knocked down houseflies were observed relative to the elapse of time. After 11 minutes 20 seconds, only knocked down insects were taken out, transferred to an observation cage, given feed and mortality was calculated by observing killed numbers after 24 hours. The result is shown in Table 12.

TABLE 12

| Insecticidal Composition | Knockdown ratio relative to the lapse of time, percent | | | | | | | | | | Mortality after 24 hours, percent |
|---|---|---|---|---|---|---|---|---|---|---|---|
| | 30″ | 42″ | 1″ | 1′25″ | 2′ | 2′50″ | 4′ | 5′40″ | 8′ | 11′20″ | |
| The 40 times diluted emulsion of emulsifiable concentrate obtained in Example 27 | 0 | 0 | 4 | 13 | 26 | 41 | 59 | 80 | 89 | 99 | 77 |

Example 41

The wettable powder of Example 29 was diluted by 1,500 times with water to obtain an aqueous solution, which was sprayed upon about 20 rice seedlings in 3 inch flower pots which were at the stage of growth of having 3 to 4 leaves, i.e. 30 days had passed since the seeds were sown, at a rate of 6 ml. per one pot placed upon a turn table. After dried in air, the whole set was covered with a metal screen and about 20 small brown planthopper adults were liberated therein. After 24 hours later it was found that 100 percent of the planthoppers was killed.

Example 42

The wettable powder of Example 29 was diluted to 100 times volume with water to obtain an aqueous solution, which was sprayed upon radishes in a flower pot which were at the stage of growth of having 5 to 6 leaves, i.e. 30 days had passed since the seeds were sown, and on which a large number of green peach aphides had been parasitized upon, at a rate of 10 ml. per one plant.

It was found that 100 percent of the aphides was killed after 24 hours.

Example 43

Forty milligrams of the granules of Example 30 was dropped in 10 liters of water placed in a 14 liter-volume polyethylene bucket. After 2 days larvae of northern house mosquito were liberated therein. It was found that 100 percent of the larvae was killed after 24 hours.

What we claim is:

1. A phthalimide compound of the formula

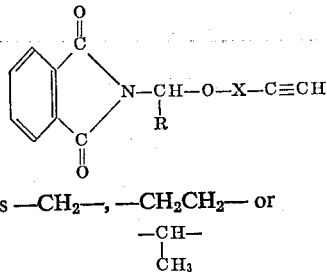

wherein X is —CH$_2$—, —CH$_2$CH$_2$— or

—CH—
  |
  CH$_3$ and R is a hydrogen atom or methyl group.

2. A compound according to claim 1 having the formula

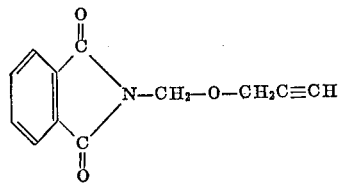

3. A compound according to claim 1 having the formula

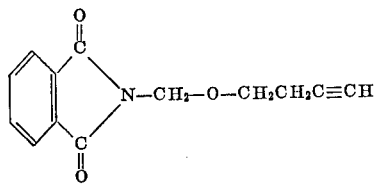

4. A compound according to claim 1 having the formula

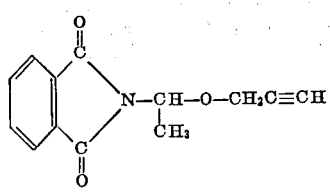

5. A compound according to claim 1 having the formula

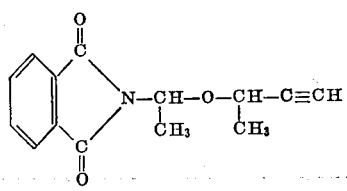

6. A compound according to claim 1 having the formula

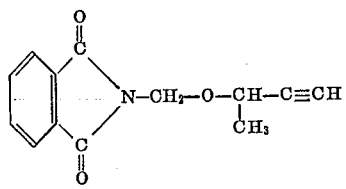

References Cited

UNITED STATES PATENTS 3,221,019  11/1965  Biel et al. _____ 260—295

OTHER REFERENCES

Ettlinger et al., J. Am. Chem. Soc., 77- 1831–36, QD 1.A5.

NICHOLAS S. RIZZO, *Primary Examiner.*

J. A. NARCAVAGE, *Assistant Examiner.*